United States Patent [19]
Garland et al.

[11] Patent Number: 6,144,772
[45] Date of Patent: Nov. 7, 2000

[54] VARIABLE COMPRESSION ENCODING OF DIGITIZED IMAGES

[75] Inventors: Harry T. Garland, Los Altos; Olagappan Manickam, Cupertino, both of Calif.

[73] Assignee: Canon Kabushiki Kaisha, Tokyo, Japan

[21] Appl. No.: 09/015,591

[22] Filed: Jan. 29, 1998

[51] Int. Cl.[7] .............................. G06K 9/36; G06K 9/00; A61B 6/04

[52] U.S. Cl. ......................... 382/239; 382/240; 382/131; 382/132; 378/37

[58] Field of Search .................................... 382/232, 128, 382/130, 131, 132, 240, 239, 244, 250, 256, 270, 272, 299; 378/901, 37

[56] References Cited

U.S. PATENT DOCUMENTS

| | | | |
|---|---|---|---|
| 4,903,317 | 2/1990 | Nishihara et al. | 382/244 |
| 5,267,334 | 11/1993 | Normille et al. | 382/56 |
| 5,282,255 | 1/1994 | Bovik et al. | 382/56 |
| 5,333,212 | 7/1994 | Ligtenberg | 382/250 |
| 5,764,803 | 6/1998 | Jacquin et al. | 382/236 |
| 5,764,814 | 6/1998 | Chen et al. | 382/243 |
| 5,790,708 | 8/1998 | Delean | 382/276 |
| 5,867,602 | 2/1999 | Zandi et al. | 382/248 |
| 5,907,640 | 5/1999 | Delean | 382/276 |
| 5,917,929 | 6/1999 | Marshall et al. | 382/132 |
| 6,057,884 | 5/2000 | Chen et al. | 348/416 |

OTHER PUBLICATIONS

"Digital Image Compression Techniques," M. Rabbani and P. W. Jones, SPIE, 1991, pp. 190–202.
William B. Pennebaker and Joan L. Mitchell; "JPEG Still Image Data Compression Standard"; 1993; pp. 1–638.

*Primary Examiner*—Thomas D. Lee
*Assistant Examiner*—Wenpeng Chen
*Attorney, Agent, or Firm*—Fenwick & West LLP

[57] ABSTRACT

Regions of a source image (900) are encoded at different levels of image quality. A plurality of image quality levels are defined (1010). In addition, the source image (900) is divided into one or more regions (912, 914, 916) and one of the image quality levels is assigned to each region (1012). Next, the entire source image (900) is encoded, preferably with JPEG encoding, at the lowest image quality level $Q_1$, assigned to the image (1016). Then, the encoded source image (900) is decoded by a matching decoding process into a reference frame (1018). If the next highest image quality level $Q_2$ is lossy, then the reference frame and source image are scaled according to the image quality level $Q_2$ (1020). Then, differences between the source image and the reference frame are determined for all lossy regions assigned an image quality level greater than or equal to the image quality level $Q_2$, and stored in a differential frame (1024). The differential frame is encoded according to the image quality level $Q_2$ (1026), stored with the reference frame, then decoded to become the new reference frame (1028). These steps are repeated until the highest quality level assigned to a region is encoded. If the image quality level is lossless, then the reference frame is scaled to the resolution of the source image (1030), and the differential components are losslessy encoded (1038). When the variably encoded image is decoded, each of the selected regions (912, 914, 916) has the image quality defined by the assigned image quality level.

17 Claims, 7 Drawing Sheets

6,144,772

VARIABLE COMPRESSION ENCODING OF DIGITIZED IMAGES

BACKGROUND OF THE INVENTION

1. Field of the Invention

This invention pertains in general to encoding digitized images and in particular to a method for encoding different regions of an image at different levels of image quality.

2. Description of Background Art

The medical field often relies on images, like those from X-ray photography and magnetic resonance imaging (MRI), to assist in the diagnosis and treatment of patients. These images are often acquired and stored digitally. For example, modem X-ray systems capture the X-rays on a digital plate and produce a digital image therefrom. Even images from analog sources are frequently digitized in order to facilitate storage and retrieval.

These digital images are often quite large. An uncompressed grayscale image having a resolution of 3000×2000× 12-bit pixels requires about nine megabytes of storage space and a typical image storage system may store thousands of such images. In response, image compression techniques have been developed to reduce the amount of space needed to store digital images. One well-known compression technique is Joint Photographic Experts Group (JPEG) encoding.

JPEG encoding is either "lossy" or "lossless." In lossy encoding, some high-frequency image information is discarded. Lossy compression can be used to obtain high compression rates with only a negligible decrease in decoded image quality. In lossless encoding, all image information is preserved and the decoded image quality is unchanged from that of the source. Lossless encoding, however, does not compress the source image to the same extent as lossy encoding.

Certain fields, like the medical field, resist using lossy encoding due to a concern that important image information will be lost. Accordingly, even lossy encoding in which the amount of lost information is too small to make a practical difference is discouraged.

Nevertheless, many medical images can be roughly divided into important regions containing information relevant to diagnosis or treatment and less important regions containing information of lessor relevance. For example, in an X-ray of a broken bone, the region of the image showing the break is an important region while the surrounding regions, assuming the regions do not show anything remarkable, are less important regions. Although less important regions should be retained in the image in order to provide context to the important regions, the less important regions need not be retained with the same fidelity as the important regions. In addition, these distinctions are also applicable to other fields wherein a large number of digitized images must be stored yet the image can be divided into important and less important regions.

JPEG encoding, however, does not specify a technique for encoding different regions of an image at different levels of image quality. Although the JPEG standard includes a "hierarchical mode" wherein an image is encoded into a reference frame and differential frames successively refining the reference frame, the hierarchical mode operates on the entire image and does not contemplate encoding different regions of an image at different image quality levels. Hierarchical coding is discussed in detail in William B. Pennebaker and Joan L. Mitchell, *JPEG Still Image Data Compression Standard*, Van Nostrand Reinhold, 1993, which is hereby incorporated by reference herein. Therefore, there is a need for an image encoding technique that allows different regions of an image to be encoded at different levels of image quality.

SUMMARY OF THE INVENTION

The above needs are met by a method of encoding different regions of a source image (900) at different levels of image quality. The source image (900) is displayed on a display (118) of a computer system (100). Through the use of a mouse or other pointing device (114), a computer user creates borders around regions of the source image that the user wishes to encode at higher quality than other regions (1014).

The user also defines a plurality of image quality levels (1010). An image quality level may be lossy or lossless. A lossy image quality level is that in which some image information is lost during compression and is comprised of two factors: resolution and compression. The resolution factor determines by how many times the source image is downsampled during encoding. In general, the greater the amount of downsampling, the lower the resulting image quality and higher the compression.

The compression factor controls the amount of high frequency information that is lost during encoding. As part of the lossy JPEG encoding process, a discrete cosine transform (DCT) is performed on blocks of the source image to produce DCT coefficients. The DCT coefficients are then quantized by one or more quantization tables. The compression factor controls an amount by which the quantization tables are scaled before quantization. In general, the higher the compression factor, the lower the resulting image quality. In lossless encoding, all image information is preserved during encoding and, accordingly, the source image is not downsampled during encoding.

The user assigns an image quality level to each of the selected regions of the source image (1012). In addition, the user may assign an image quality level to the background, or non-selected regions, of the source image. This background image quality level is the lowest image quality level at which the source image is encoded.

During encoding, the entire source image is encoded, preferably with Joint Photographic Experts Group (JPEG) encoding, at the background image quality level (1016). Then, the encoded image is decoded into a reference frame via a matching decoding process (1018).

Next, the encoder determines the region or regions of the source image assigned the next higher image quality level. If the image quality level indicates lossy encoding, then the reference frame and the source image are downsampled by the amount specified by the resolution factor (1020) for the image quality level. Then, differential components indicating the differences between the source image and the reference frame for the pixels in the selected region or regions are calculated and stored in a differential frame (1024). In addition, differential components are calculated and stored for each lossy region assigned an image quality level greater than that of the current region (1024). Differential components in the differential frame corresponding to regions for which difference values are not calculated are set to zero (1022). Then, the differential frame is lossy JPEG encoded (1026). As part of the encoding process, DCT coefficients are generated from the differential frame. The DCT coefficients are quantized by quantization tables that have been scaled according to the value of the compression level factor in the image quality level. The encoded image, including the reference frame and the differential frame, is then decoded using a matching decoding process and becomes the new reference frame for subsequent encoding iterations (1028). The above encoding is repeated, in order of increasing image quality level, for each region of the source image assigned a lossy image quality level.

When encoding a region that is assigned a lossless quality level, the reference frame is scaled, if necessary, to the same resolution as the source image (1030). Then, differential components between the source image and the reference frame are calculated for the regions to be losslessly encoded and stored in a differential frame (1034). Regions in the differential frame for which difference values are not calculated are set to zero (1032). Next, a point transform is performed on the differential components (1036). Then, the differential frame is losslessy encoded with an entropy encoder and combined with the source image and any lossy encoded frames to form variably encoded image (1038).

When an image encoded as described above is decoded, each selected region will have the amount of image detail specified by the assigned image quality level. Preferably, information is stored in the encoded image describing the image quality levels and the selected regions. If desired, a decoder decoding the image can use this information to draw borders identifying the selected regions or provide other information about the encoding.

DETAILED DESCRIPTION OF THE PREFERRED EMBODIMENTS

Figure 1:
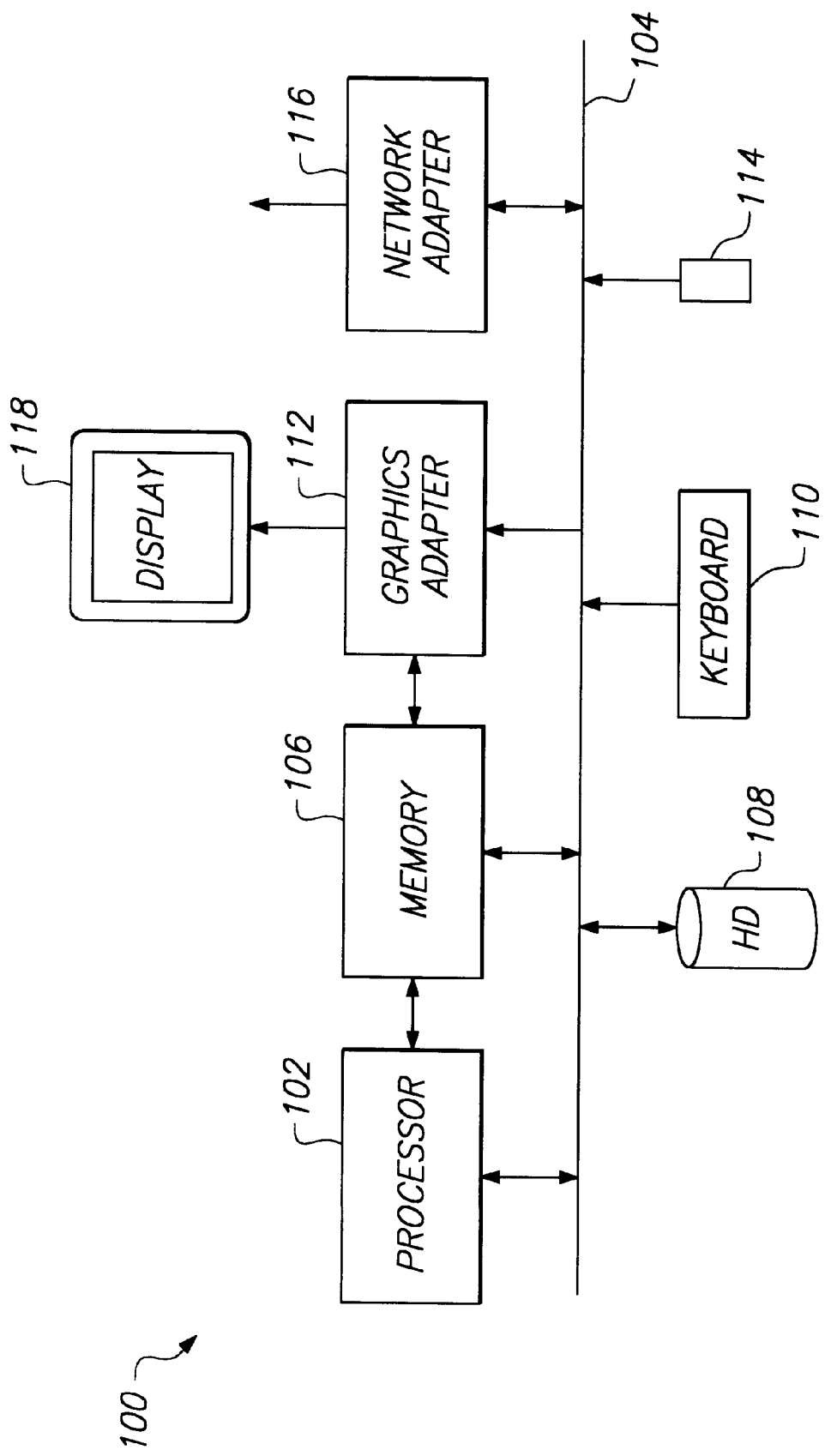
FIG. 1 is a high-level block diagram illustrating a computer system 100 for performing variable quality image encoding according to an embodiment of the present invention.

FIG. 1 is a high-level block diagram illustrating a computer system 100 adapted to perform variable quality image encoding according to one embodiment of the present invention. Illustrated are a processor 102 coupled to a bus 104. Also coupled to the bus 104 are a memory 106, a storage device 108, a keyboard 110, a graphics adapter 112, a pointing device 114, and a network adapter 116. A display 118 is coupled to the graphics adapter 112.

The processor 102 may be any general-purpose processor such as an INTEL x86 compatible central processing unit (CPU). The permanent storage device 108 may be any device capable of holding large amounts of data, like a hard drive, compact disk read-only memory (CD-ROM), digital versatile disk (DVD), or some form of removable storage device. The memory 106 holds instructions and data used by the processor 102. The pointing device 114 may be a mouse, track ball, light pen, touch-sensitive display, or other type of pointing device and is used in combination with the keyboard 110 to input data into the computer system 100. The graphics adapter 112 can display images and other information on the display 118. The network adapter 116 couples the computer system 100 to a local or wide area network (not shown).

A program for performing variable quality image encoding according to one embodiment of the present invention is preferably stored on the storage device 108 and executed on the processor 102 from memory 106. Alternatively, hardware or software modules may be stored within the computer system 100 for performing the method steps described herein. This program preferably uses the graphics adapter 112 to generate a graphical user interface (GUI) and display an image on the display 118. Through the use of the keyboard 110 or pointing device 114, a user may select and highlight one or more regions of the image. In addition, the user may use the keyboard 110 and pointing device 114 to control the various variable encoding options and settings described below.

A preferred embodiment of the present invention utilizes Joint Photographic Experts Group (JPEG) encoding. The JPEG standard specifies a sequential encoding mode and a hierarchical encoding variation thereof for lossy and lossless encoding. Brief descriptions of the sequential and hierarchical modes are included herein in order to better explain the present invention.

Figure 2:
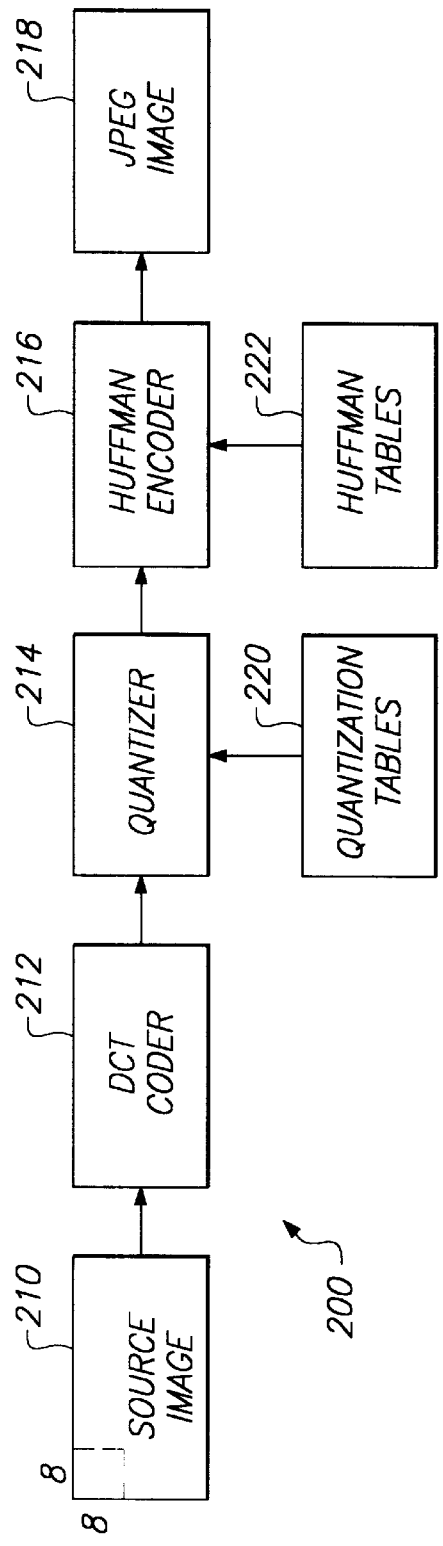
FIG. 2 is a block diagram illustrating a prior art sequential mode lossy JPEG encoder 200.

FIG. 2 is a block diagram illustrating the functional units of a prior art sequential mode lossy JPEG encoder 200. FIG. 2, like FIGS. 3–5, can also be interpreted as a flow chart illustrating method steps. A source image 210 is received by a discrete cosine transform (DCT) coder 212. The output of the coder 212 is provided to a quantizer 214. The output of the quantizer 214 is provided to a Huffman encoder 216 or other form of entropy encoder. The output of the Huffman encoder 216 is stored as a JPEG image 218.

In operation, the source image 210 is divided into 8×8 blocks of pixels. The DCT coder 212 receives the 8×8 blocks and transforms each block using a forward DCT (FDCT) into a set of 64 DCT coefficients. The quantizer 214 quantizes each of the 64 coefficients using one of 64 corresponding values stored in a quantization table 220. The values in the quantization table 220 are specified by the particular JPEG encoding application and may be customized to affect particular image characteristics. In addition, different quantization tables may be used for different sets of coefficients. Once quantized, the coefficients are passed to the Huffman encoder 216, which uses values stored in Huffman tables 222 to compress the quantized coefficients. The Huffman encoded quantized coefficients are stored as the JPEG image 218. In addition, the quantization tables 220 and Huffman tables 222 are stored in the JPEG image 218 to assist in decoding.

Figure 3:
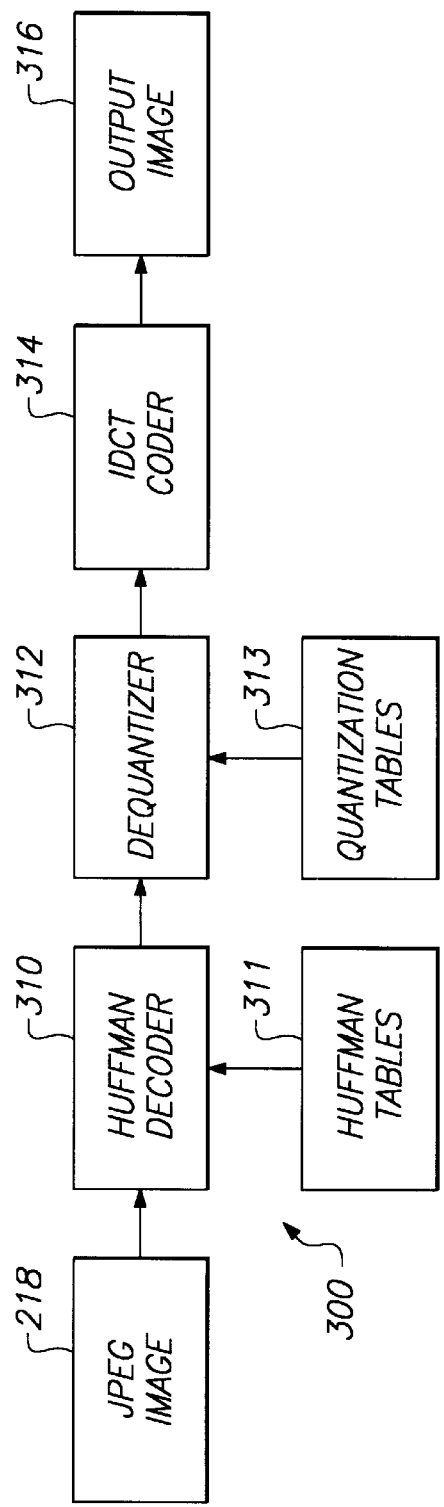
FIG. 3 is a block diagram illustrating a prior art sequential mode lossy JPEG decoder 300.

FIG. 3 is a block diagram illustrating the functional units of a prior art sequential mode JPEG decoder 300. Shown are the JPEG encoded image 218, a Huffman decoder 310 or other type of entropy decoder, a dequantizer 312, an inverse discrete cosine transform (IDCT) coder 314, and an output image 316. Each unit illustrated in FIG. 3 essentially performs the reverse of its corresponding unit in FIG. 2. The Huffman decoder 310 uses Huffman tables 311 extracted from the JPEG image 218 to decode the quantized DCT coefficients. The dequantizer 312 uses quantization tables 313 extracted from the JPEG image 218 to dequantize the DCT coefficients. After dequantization, groups of 64 DCT coefficients are transformed into 8×8 blocks of samples by the IDCT coder 314. The 8×8 blocks of samples are combined into the output image 316.

Figure 4:
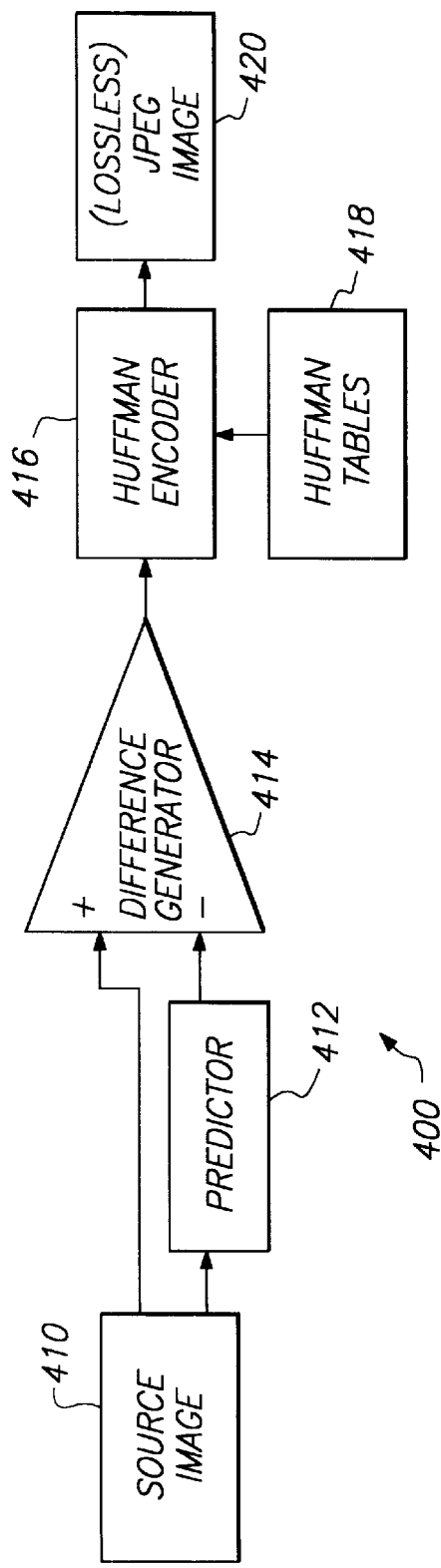
FIG. 4 is a block diagram illustrating a prior art lossless JPEG encoder 400.

FIG. 4 is a block diagram illustrating the functional units of a prior art lossless JPEG encoder 400. For each sample in the source image 410, up to three neighboring samples are sent to a predictor 412. The predictor, in turn, combines the neighboring samples using a defined prediction function to form a prediction of the sample. A difference generator 414 calculates the difference between the actual and predicted values for the sample. The difference values for all of the samples are provided to a Huffman encoder 416 using Huffman tables 418, or other lossless entropy encoder, and the resulting output is stored as a lossless JPEG image 420.

Figure 5:
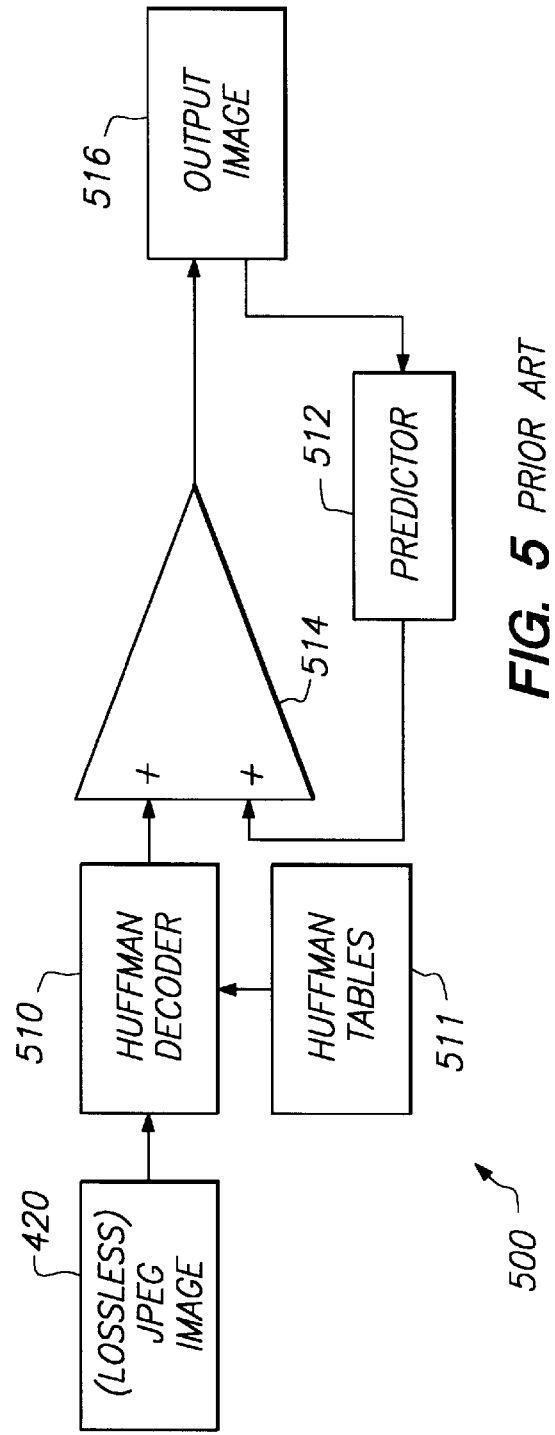
FIG. 5 is a block diagram illustrating a prior art lossless JPEG decoder 500.

FIG. 5 is a block diagram illustrating the functional units of a prior art lossless JPEG decoder 500. First, a Huffman decoder 510 uses Huffman tables 511 extracted from the JPEG image 420 to decode the difference values. An adder 514 receives the difference values and adds each difference value to the predicted value for the corresponding sample as generated by a predictor 512 using the same prediction function as the lossless JPEG encoder 400. The output samples of the adder 514 are combined to form an output image 516.

Figure 6:
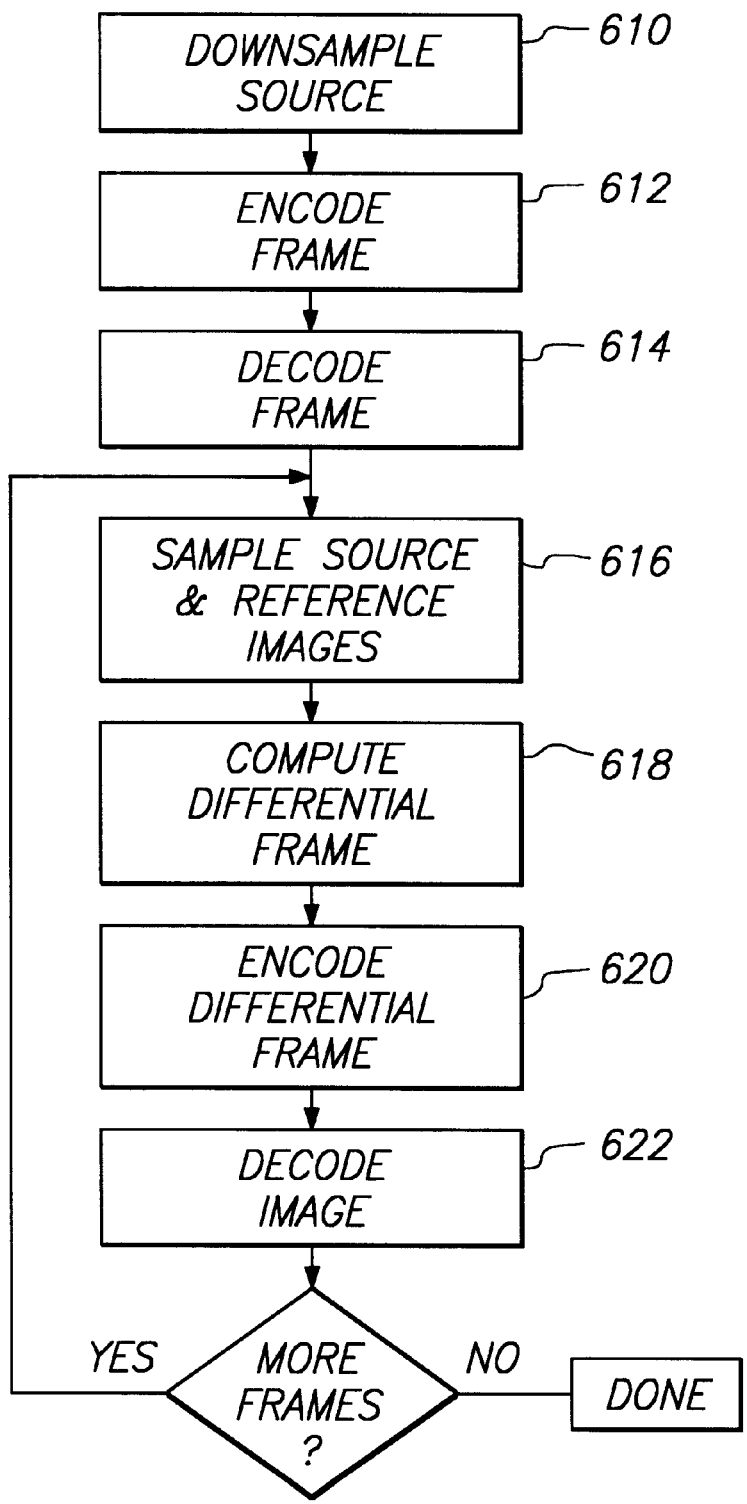
FIG. 6 is a flow chart illustrating steps performed in prior art hierarchical mode JPEG encoding.

FIG. 6 is a flow chart illustrating the steps performed in prior art hierarchical mode JPEG encoding. First, a source image is downsampled by a factor that is a power of two in either or both dimensions 610 to generate a reduced size image, or frame. Then, this frame is JPEG encoded using a process like that described with respect to FIG. 2 612. The JPEG encoded frame is next decoded using a matching JPEG decoding technique like that described with respect to FIG. 3 614, thereby producing a reference frame.

If necessary, the reference frame is upsampled by the same factor and in the same dimensions as it was downsampled. The source image is downsampled, if necessary, to the same resolution as the reference frame 616. The reference frame is used as a prediction of the source image at the downsampled resolution and a differential frame holding the differences between corresponding pixel values is computed therefrom 618. The differential frame is then JPEG encoded as described with respect to FIG. 2 620 and combined with the reference frame to form a hierarchically encoded JPEG image. Finally, the resulting JPEG encoded image is decoded using matching decoding and the decoded image becomes the reference frame in subsequent iterations of the encoding steps 622. These steps 616, 618, 620, 622 are repeated until the source image is encoded at its original resolution.

Hierarchical decoding is performed by decoding the first frame into a reference frame and then repeatedly upsampling and refining the reference frame with decoded differential frames. Complete descriptions of JPEG encoding and decoding are found in William B. Pennebaker and Joan L. Mitchell, JPEG Still Image Data Compression Standard, Van Nostrand Reinhold, 1993, which is hereby incorporated by reference herein.

Figure 7:
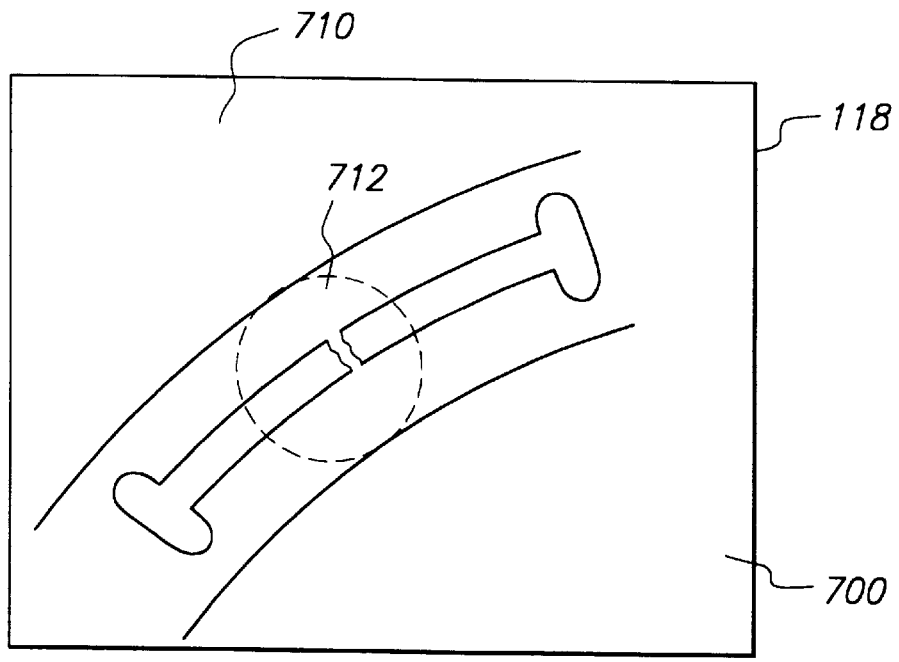
FIG. 7 illustrates an image 700 displayed on the display 118 of the computer system 100 of FIG. 1.

FIG. 7 illustrates an image 700 displayed on the display 118. The image 700 has a background region 710 and a selected region 712. The example illustrated in FIG. 7 represents one embodiment of the present invention wherein a user wishes to losslessly encode information in the selected region 712 but can tolerate lossy encoding of the background region 710. Although only one selected region is shown in this example, any number of regions may be selected and losslessly preserved.

Figure 8:
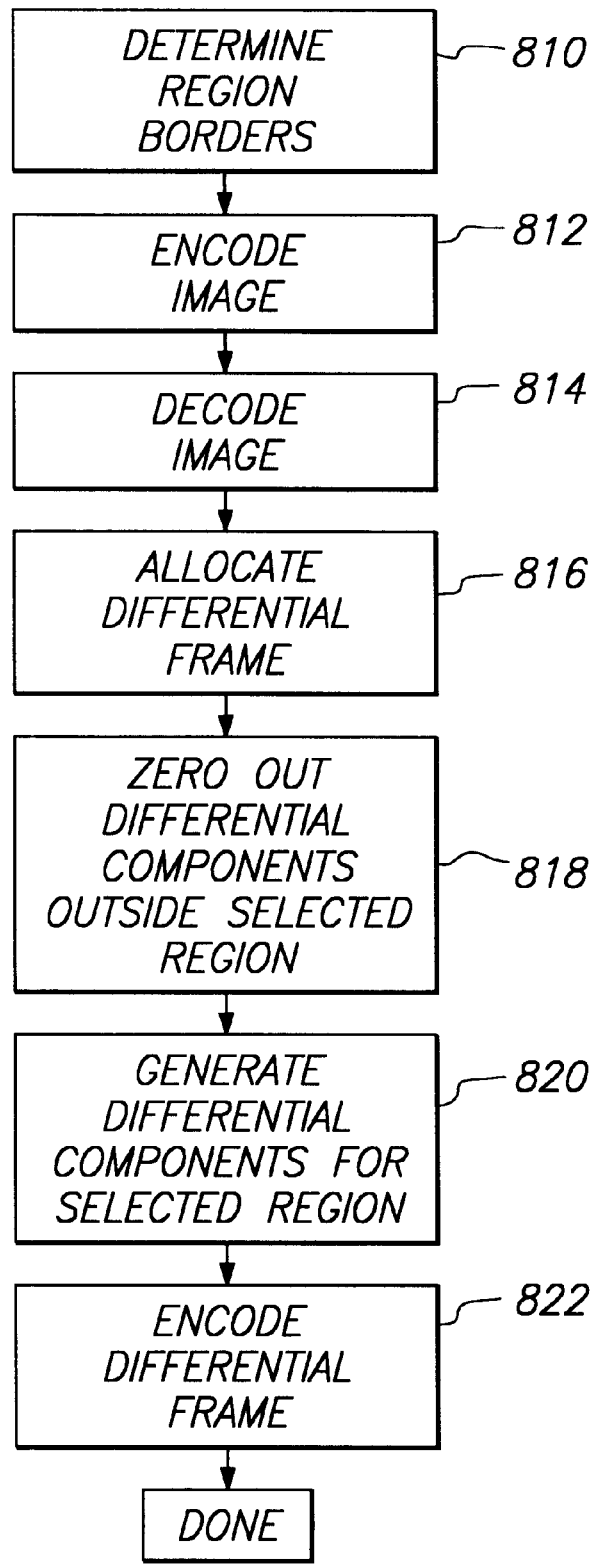
FIG. 8 is a flow chart illustrating steps for performing variable resolution encoding according to one embodiment of the present invention wherein at least one region is losslessly encoded and another region is lossy encoded.

FIG. 8 is a flow chart illustrating the steps for performing variable quality encoding of an image like that illustrated in FIG. 7. First, the borders of the region or regions selected by the user for lossless encoding are defined 810. The user preferably defines the borders by drawing a bounding shape over the displayed source image. According to a preferred embodiment of the present invention, the user uses the pointing device 114 to draw region boundaries at the pixel level of resolution.

Lossy JPEG encoding, however, operates on 8×8 blocks of pixels. Therefore, it is necessary to divide the image into 8×8 pixel blocks and determine which blocks fall inside the selected region 712. In one embodiment of the present invention, those blocks having at least one pixel inside the selected region are considered to be within the selected region and become the effective border of the selected region for the remainder of the encoding process.

Next, the entire source image 700, including the background 710 and the selected region 712, is encoded using sequential lossy JPEG encoding 812 like that illustrated in FIG. 2. Then, the encoded image is decoded using matching JPEG decoding 814, thereby generating a reference frame.

At this point, a differential frame having the same resolution as the reference frame is allocated 816. In addition, the locations in the differential frame corresponding to the background region 710, i.e. the non-selected regions, are initialized to zero. Then, the differential components between the selected region 712 in the source image 700 and the corresponding region within the reference frame are generated and stored in the corresponding region within the differential frame 820. The differential components are preferably determined directly, without using prediction, and are calculated modulo $2^{16}$. Then, a point transform is applied to the differential components. The point transform is preferably an integer divide by $2^{Pt}$, where Pt is the value of a point transform parameter. Next, the differential frame is losslessy JPEG encoded 822 using a process like that shown in FIG. 4 and stored with the reference frame using hierarchical encoding like that illustrated in FIG. 6 to form a variably encoded JPEG image.

The encoding process of FIG. 8 results in lossless encoding for the selected region 712 and lossy encoding for the background region 710. In practice, bounded errors may occur when the encoded image is decoded on a system different than the encoding system due to rounding errors introduced by software and hardware. However, these rounding errors are usually visually undetectable and often fall below the threshold of sampling errors introduced when creating the source image.

Figure 9:
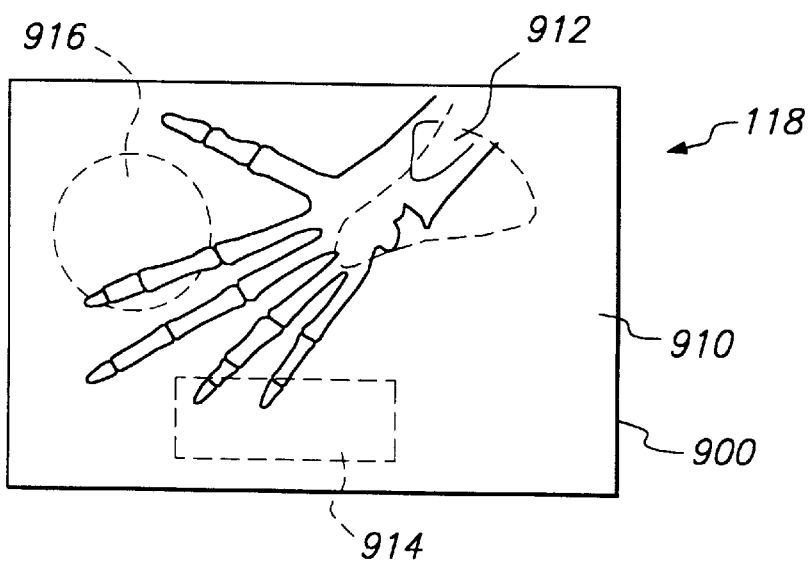
FIG. 9 illustrates an image 900 displayed on the display 118 of the computer system 100 of FIG. 1.

The embodiment of variable quality encoding illustrated above can be extended to provide multiple levels of lossy encoding along with lossless encoding. FIG. 9 illustrates an image 900 displayed on the display 118. The image 900 has a background region 910 and three selected regions 912, 914, 916, wherein a user wishes to preserve more information in the selected regions than in the background 910. In this example, the selected regions, 912, 914, and 916, are numbered in ascending order of importance. Thus, the user can tolerate some image quality loss in region 912, less image quality loss in region 914, and even less image quality loss in region 916. Although only three selected regions are shown in FIG. 9, a preferred embodiment of the present invention allows any number of regions to be selected and ranked. In addition, multiple regions may be assigned the same level of importance.

Figure 10:
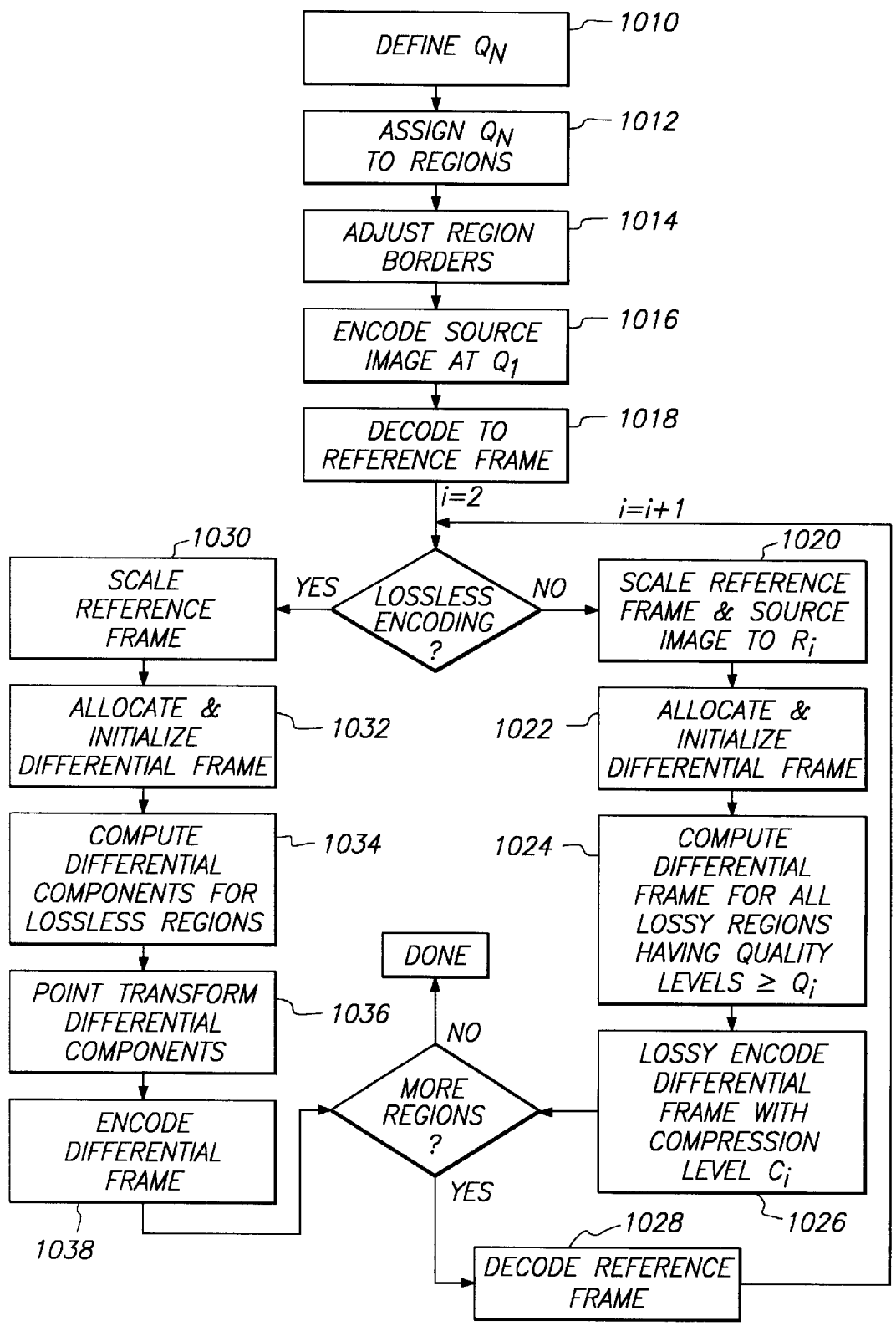
FIG. 10 is a flow chart illustrating steps for performing variable resolution encoding of different regions of a source image according to a preferred embodiment of the present invention.

FIG. 10 is a flow chart illustrating the steps for performing variable quality encoding of a source image like that illustrated in FIG. 9 according to a preferred embodiment of the present invention. First, a range of image quality levels $Q_n$ are defined 1010. Each image quality level is defined by two factors: 1) resolution; and 2) compression level.

The resolution factor controls the resolution to which the source image is downsampled during encoding. As with hierarchical encoding, the source image may be downsampled by powers of two in either or both the X and Y dimensions. For example, the resolution factor may be set to ½ resolution in both dimensions, resulting in a frame reduced by 4 times from the source image. The greater the rate of downsampling, the lower the image quality at a particular image quality level. If an image quality level is lossless, then the resolution factor does not downsample the source image.

The compression level factor controls the amount of high frequency information in the source image that is discarded during encoding due to quantization of the DCT coefficients. As mentioned above with respect to FIG. 2, each DCT coefficient is quantized using one of 64 corresponding values stored in a quantization table 220. The compression level factor controls a scale, $\alpha$, by which a quantization table is multiplied before it is used for quantization. A larger $\alpha$ results in more information loss during quantization and a corresponding reduction in image quality. If an image quality level is lossless, then this factor is ignored.

Through manipulating these two factors, a number n of image quality levels $Q_n$ are defined and ordered, first by resolution and then by compression level. One embodiment of the present invention reduces the burden on the user by automatically calculating the factors for the image quality levels. For example, the present invention may allow the user to select a number of image quality levels and a range of image quality, then automatically generate image quality levels spanning the range. In such an embodiment, the highest image quality level may be defined as lossless.

Once the image quality levels, $Q_n$, each having a resolution factor, $R_n$, and a compression factor, $C_n$, are defined, the user assigns a particular image quality level to each defined region in the image 1012. In the exemplary screen display of FIG. 9, assume the user has selected three lossy image quality levels $Q_1$, $Q_2$, and $Q_3$, and one lossless level $Q_4$, and respectively assigned the levels to the background 910, region 912, region 914, and region 916. If desired, multiple regions can be assigned to the same image quality level. In addition, the order of these defining 1010 and assigning 1012 steps can be altered.

At this point, the region borders are adjusted to include the 8×8 pixel blocks encompassing the selected borders 1014. If an 8×8 block falls within more than one region, then the block is assigned to the region having the highest image quality level. Then, the entire frame is encoded at the quality level assigned to the image background $Q_1$, 1016. As part of this encoding, the source image is downsampled to the corresponding resolution factor $R_1$. Then, a DCT is performed on the downsampled image and the resulting coefficients are quantized using quantization tables modified by the corresponding compression factor $C_1$. Once the source image has been encoded at the background quality level $Q_1$, the image is decoded into a reference frame using a matching decoding process 1018.

Next, the region assigned the next higher image quality level $Q_2$ is considered. The reference frame is upsampled, if necessary, and the source image is downsampled, if necessary, to the defined resolution factor $R_2$ 1020. Then, a differential frame with resolution $R_2$ is allocated and pixels outside regions having a quality level greater than or equal to $Q_2$ are set to zero 1022.

The differential components for the source image and the reference frame for all lossy regions having a quality level greater than or equal to $Q_2$ are calculated and stored at the corresponding positions in the differential frame 1024. Differential components for the lossless regions are not encoded at this stage because doing so might lead to unacceptable rounding errors when the lossless regions are later encoded. When determining the differential components, the reference image is preferably used as a predictor of the source image, and the differences between the actual value and the predicted value are stored. In the example of FIG. 9, therefore, difference values for regions 912, 914, and 916 are calculated and stored in the differential frame.

Next, the differential frame is lossy JPEG encoded and stored using hierarchical encoding with the reference frame as a JPEG image. As part of the encoding, a DCT is performed on the differential frame and the resulting coefficients are quantized using quantization tables modified by compression factor $C_2$ 1026.

If there are more regions to encode, then the differential frame is decoded and becomes the reference frame for subsequent iterations of the encoding 1028. The encoding iterates for each quality level assigned to a region in the image. In the example of FIG. 9, therefore, the lossy encoding is iterated for regions 912 and 914.

When encoding the lossless region 916, the reference frame must be upsampled to the level of source image and the source image is not downsampled 1030. Next, a differential frame having the same resolution as the source image is allocated and pixels outside those regions 916 assigned a lossless quality level are initialized to zero 1032. Then, the differential components for the lossless region 916 are preferably determined directly, without using prediction, and are calculated modulo $2^{16}$ 834. In addition, a point transform is performed on the differential components 836. The differential frame is then losslessy JPEG encoded and stored with the other frames using hierarchical encoding 1038.

Information about the encoded image, such as the bordered regions and image quality levels, is preferably stored within the image during JPEG encoding through the use of the application marker segment syntax. This syntax allows the encoder to incorporate application-specific information into the encoded JPEG image. Accordingly, the information can be displayed by a variable quality-aware decoder and ignored by standard JPEG decoders.

When the variable-resolution image generated according to the embodiment illustrated by FIG. 10 is decoded, the first, or non-differential, frame is decoded into an image. Then, the differential frames are sequentially decoded and successively refine the image. Accordingly, a user viewing the decoding will typically see a relatively blurry image followed by a gradual refinement of the selected regions as the differential frames are decoded. While displaying the image, a preferred embodiment of the present invention provides information about the selected regions, the image quality levels, and the factor values for each image quality level.

In addition, a preferred embodiment of the present invention can be configured to display borders around the selected regions of the decoded image. These borders can be generated, for example, from the stored data within the encoded image or from the differential frames. In addition, the present invention can preferably indicate the image quality level of a region by, for example, changing the color of a border.

Although a preferred embodiment of the present invention uses JPEG encoding and decoding, the present invention can be used with other encoding techniques and file formats, including ADOBE's portable data format and Moving Picture Experts Group (MPEG) encoding. In MPEG, a group of images is organized in a sequence. MPEG encoding encodes differential information based on changes between the images in the sequence. Accordingly, the present invention can be applied to MPEG encoding to preserve difference information in selected regions while discarding it in other regions.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the present invention.

What is claimed is:

1. A method for variably encoding a source image, such method comprising the steps of:
   defining a plurality of image quality levels each specifying a quality at which an image is encoded;
   assigning, to each of a plurality of regions of the source image, one of the plurality of image quality levels; and
   iteratively encoding, for each assigned image quality level and in increasing order of image quality level, each region of the source image having the assigned image quality level and those regions assigned a lossy image quality level at least as great as the assigned image quality level to produce an encoded image.

2. The method of claim 1, wherein the step of defining a plurality of image quality levels comprises the substeps of:
   determining a resolution to which the image is scaled during encoding; and
   determining an amount of frequency information in the image that is lost during encoding.

3. The method of claim 2, wherein the determined resolution scales the image by a power of two.

4. The method of claim 2, wherein no image frequency information is lost during encoding.

5. The method of claim 1, wherein the assigning step comprises the substeps of:
   displaying the source image;
   defining a border for each of the plurality of regions on the displayed source image; and
   assigning, to each of the plurality of regions defined by a border, one of the plurality of image quality levels.

6. The method of claim 5, wherein the encoding step operates on blocks of the source image and further comprises the substep of:
   adjusting the defined borders to include blocks of the source image through which the borders pass.

7. The method of claim 1, wherein the step of iteratively encoding each region of the source image having the assigned image quality level comprises the substeps of:
   scaling the source image by a scale factor determined from the image quality level at which the region is being encoded; and
   computing differential components for those regions assigned a lossy image quality level at least as great as the region being encoded to produce a differential frame.

8. The method of claim 7, further comprising the step of:
   lossy compressing the differential frame, wherein an amount of information loss is determined from the image quality level.

9. The method of claim 5, further comprising the steps of:
   decoding the single encoded image to a decoded image;
   displaying the decoded image; and
   superimposing, over the displayed decoded image, graphical data indicating the defined borders.

10. The method of claim 9, wherein the graphical data indicates the image quality level assigned to each of the plurality of regions.

11. The method of claim 1, wherein computer instructions for performing the method steps are stored on a computer-readable medium.

12. A method for variably encoding a digitized source image, such method comprising the steps of:
    selecting at least one region of the source image, wherein the at least one selected region is less than the entire source image;
    encoding the source image at a first image quality level to produce a reference image;
    assigning, to each selected region of the source image, a lossy image quality level higher than the first image quality level; and
    for each assigned image quality level, and in increasing order of assigned image quality level, refining the reference image by iteratively encoding the selected regions having the assigned lossy image quality level and those regions assigned a lossy image quality level at least as great as the assigned image quality level, to produce an encoded image.

13. The method of claim 12, wherein the encoding step encodes blocks of the source image, the refining step encodes blocks of the source image, and the selecting step further comprises the substeps of:
    determining borders of the at least one selected region of the source image; and
    adjusting the borders to include the blocks through which the borders pass.

14. The method of claim 12, wherein the refining step comprises the substeps of:
    generating differential components from the reference image and the selected regions to produce a differential image; and
    storing the differential image with the reference image in a variably encoded image.

15. The method of claim 14, wherein the storing step comprises the substep of:
    encoding the differential image and the reference image with JPEG encoding.

16. The method of claim 10, wherein computer instructions for performing the method steps are stored on a computer-readable medium.

17. A computer-readable medium having computer program instructions recorded thereon for variably encoding a source image stored in a memory of a computer system, the instructions comprising:

instructions for defining a plurality of image quality levels each specifying a quality at which an image is encoded;

instructions for assigning, to each of a plurality of regions of the source image in the memory, one of the plurality of image quality levels; and instructions for iteratively encoding, for each assigned image quality level and in increasing order of image quality level, each region of the source image having the assigned image quality level and those regions assigned a lossy image quality level at least as great as the assigned image quality level to produce an encoded image.

* * * * *